United States Patent
Li et al.

(10) Patent No.: US 11,322,107 B2
(45) Date of Patent: May 3, 2022

(54) GATE DRIVER ON ARRAY CIRCUIT DRIVING SYSTEM AND DISPLAY DEVICE

(71) Applicant: TCL CHINA STAR OPTOELECTRONICS TECHNOLOGY CO., LTD., Shenzhen (CN)

(72) Inventors: Jilong Li, Shenzhen (CN); Yue Wang, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 269 days.

(21) Appl. No.: 16/621,760

(22) PCT Filed: Sep. 30, 2019

(86) PCT No.: PCT/CN2019/109394
§ 371 (c)(1),
(2) Date: Dec. 12, 2019

(87) PCT Pub. No.: WO2021/051453
PCT Pub. Date: Mar. 25, 2021

(65) Prior Publication Data
US 2021/0366426 A1    Nov. 25, 2021

(30) Foreign Application Priority Data
Sep. 18, 2019 (CN) .......................... 201910882578.7

(51) Int. Cl.
G09G 3/36    (2006.01)
G09G 3/00    (2006.01)

(52) U.S. Cl.
CPC .......... *G09G 3/3677* (2013.01); *G09G 3/006* (2013.01); *G09G 2330/04* (2013.01)

(58) Field of Classification Search
CPC ... G09G 3/3677; G09G 3/006; G09G 2330/04
See application file for complete search history.

(56) References Cited

U.S. PATENT DOCUMENTS

| 2012/0062534 A1* | 3/2012 | Kao ......................... G09G 3/20 345/208 |
| 2016/0097818 A1* | 4/2016 | Chiyajo ........... G01R 19/16542 429/7 |
| 2018/0190228 A1* | 7/2018 | Xu ......................... G11C 19/28 |

* cited by examiner

*Primary Examiner* — Mark W Regn
(74) *Attorney, Agent, or Firm* — Osha Bergman Watanabe & Burton LLP

(57) ABSTRACT

The present disclosure provides a gate driver on array (GOA) circuit driving system and a display panel. The GOA circuit driving system includes a power chip including a plurality of output pins, a plurality of filter units respectively corresponding to the plurality of output pins, and a GOA circuit including a plurality of signal input terminals respectively corresponding to the plurality of output pins, wherein each of the plurality of output pins is electrically connected to the corresponding signal input terminal through the corresponding filter unit, and each of the plurality of filter units is configured to filter an electrostatic voltage transmitted from the corresponding signal input terminal to the corresponding output pin, therefore solving a problem that the power chip cannot work normally due to a release of static electricity from the GOA circuit to the power chip during an ESD test.

14 Claims, 2 Drawing Sheets

GATE DRIVER ON ARRAY CIRCUIT DRIVING SYSTEM AND DISPLAY DEVICE

FIELD OF INVENTION

The present disclosure relates to the field of display technologies, and more particularly, to a gate driver on array (GOA) circuit and a display device.

BACKGROUND OF INVENTION

Liquid crystal display (LCD) has many advantages such as thin body, power saving, no radiation, etc., and is widely applied in areas such as mobile phones, personal digital assistants (PDAs), digital cameras, computer screens, notebook computer screens, etc.

Currently, most of the liquid crystal display devices on the market are backlight type liquid crystal display devices, which include a casing, a liquid crystal display panel disposed in the casing, and a backlight module disposed in the casing. The structure of the conventional liquid crystal display panel consists of a color filter, a thin film transistor (TFT) array substrate, and a liquid crystal layer disposed between the color filter and the thin film transistor array substrate.

Gate driver on array (GOA) technology is an array substrate row driving technology, which uses a TFT liquid crystal display array process to fabricate a gate scan driving circuit on a thin film transistor array substrate, in order to achieve the progressive scanning driving method. It has advantages of reducing production cost and realizing narrow frame design of panels, and are used for various displays.

Electro-static discharge (ESD) refers to charge transfer caused by objects with different electrostatic potentials coming close to each other or directly contacting each other. In current display devices, static electricity is inevitably generated during use and causes electrostatic discharge, and extremely high transient voltage generated causes electrostatic damage. For this reason, an ESD test is performed during the manufacturing process of the display device, and a discharge operation is performed to the display device during the testing process in the prior art.

Please refer to FIG. 1, the current GOA circuit driving system includes a power chip (Power IC) 100 and a GOA circuit 200 electrically connected to the power chip 100. The power chip 100 includes a plurality of output pins 110, the GOA circuit 200 includes a plurality of signal input terminals 210, and each signal input terminal 210 is correspondingly connected to an output pin 110, so that the power chip 100 outputs a plurality of drive signals including a clock signal, a constant voltage low potential, a start signal, and a low-frequency control signal by the plurality of output pins 110 respectively. The plurality of drive signals are transmitted to the GOA circuit 200 via the plurality of signal inputs 210, respectively, to drive the GOA circuit 200 to generate gate scan signal. When performing the ESD test on the display device having the GOA circuit driving system, the GOA circuit 200 reverses the electrostatic voltage of a pulse voltage having a maximum value exceeding 20 V to the power chip 100 through the plurality of signal input terminals 210 and the plurality of output, pins 110, affecting normal operation of the power chip 100 and causing the ESD test to fail. To solve this problem, please refer to FIG. 1, in the prior art, one resistor R is connected between each signal input terminals 210 and the corresponding output pin 110. However, this method does not effectively solve the problem that the GOA circuit 200 reverses the static electricity to the power chip 100. To solve this problem, the internal structure of the power chip 100 is generally redesigned, but this will increase product cost.

SUMMARY OF INVENTION

An object of the present disclosure is to provide a GOA circuit driving system, which can effectively solve the problem that the power supply chip cannot normally operate due to the static electricity transmitted from the GOA circuit to the power chip.

Another object of the present disclosure is to provide a display device, can effectively solve the problem causing the power chip fail to normally operate because the GOA circuit transmits static electricity to the power chip.

To achieve the above object, the present disclosure provides a gate driver on array (GOA) circuit driving system, including a power chip including a plurality of output pins; a GOA circuit including a plurality of signal input terminals respectively corresponding to the plurality of output pins; and a plurality of filter units respectively corresponding to the plurality of output pins;

wherein each of the plurality of output pins is electrically connected to the corresponding signal input terminal through the corresponding filter unit, and each of the plurality of filter units is configured to filter an electrostatic voltage transmitted from the corresponding signal input terminal to the corresponding output pin.

Each of the plurality of filter units includes a filter capacitor, each of the plurality of output pins and the corresponding signal input terminal are electrically connected to a first terminal of the filter capacitor of the corresponding filter unit, and a second terminal of each of the plurality of filter capacitors is grounded.

The filter capacitor is provided with a withstand voltage of 45 to 55 volts.

The plurality of output pins includes a plurality of clock signal output pins, a plurality of low-frequency control signal output pins, a start signal output pin, and a low electric potential output pin;

wherein the plurality of signal input terminals includes:
a plurality of clock signal input terminals, the plurality of clock signal input terminals respectively corresponding to the plurality of clock signal output pins;
a plurality of low-frequency control signal input terminals, the plurality of low-frequency control signal input terminals respectively corresponding to the plurality of low-frequency control signal output pins;
a start signal input terminal corresponding to the start signal output pin; and
a constant voltage low electric potential input terminal corresponding to the low electric potential output pin.

A capacitance of the filter capacitor of the filter unit corresponding to the plurality of clock signal output pins, the plurality of low-frequency control signal output pins, and the start signal output pin is at 90 to 110 pF; and a capacitance of the filter capacitor of the filter unit corresponding to the low electric potential output pin is 0.9 to 1.1 μF.

Each of the plurality of the filter units further includes a resistor, a terminal of the resistor of the filter unit corresponding to the plurality of clock signal output pins, the plurality of low-frequency control signal output pins, and the start signal output pin is connected to a first terminal of the filter capacitor, another terminal of the resistor corresponding to the plurality of clock signal output pins, the plurality of low-frequency control signal output pins, and the start signal output pin is connected to a corresponding signal input terminal, thereby connecting the corresponding signal input terminal and the first terminal of the filter capacitor;

a terminal of the resistor of the filter unit corresponding to the low electric potential output pin is electrical connected to a first terminal of the filter capacitor, another terminal of the resistor of the filter unit corresponding to the low electric potential output pin is connected to the low electric potential output pin, thereby connecting the first terminal of the filter capacitor and the low electric potential output pin.

A resistance of the resistor of the filter unit corresponding to the plurality of clock signal output pins is 50 to 60Ω;

a resistance of the resistor of the filter unit corresponding to the plurality of low-frequency control signal output pins is 810 to 830Ω;

a resistance of the resistor of the filter unit corresponding to the start signal output pin is 140 to 160Ω; and a resistance of the resistor of the filter unit corresponding to the low electric potential output pin is 9 to 11Ω.

The power chip further includes a plurality of driving signal generating units respectively corresponding to the plurality of output pins;

each input terminal of the plurality of driving signal generating units receives an original input signal corresponding to the output pin, each output terminal of the plurality of driving signal generating units is electrically connected to the output pin, and the driving signal generating units are configured to convert the original input signal to generate the driving signal, and output the driving signal by the output terminal of the driving signal generating unit to the output pin.

Each of the plurality of driving signal generating units includes an electric potential converting unit and an inverter, an input terminal of the electric potential converting unit receives the corresponding original input signal, an output terminal of the electric potential converting unit is electrically connected to an input terminal of the inverter, and an output terminal of the inverter is electrically connected to the corresponding output pin;

wherein the electric potential converting unit is configured to perform electric potential conversion on the original input signal to generate a converted input signal, and output the converted input signal from the output terminal of the electric potential converting unit to the inverter, and the inverter is configured to perform an inverting process on the converted input signal to generate the corresponding driving signal and outputs the driving signal to the corresponding output pin by the output terminal of the inverter.

The present disclosure further provides a display device, includes the GOA circuit driving system described above.

Advantageous effects of the present disclosure: the present disclosure provides a GOA circuit driving system which includes a power chip including a plurality of output pins, a plurality of filter units respectively corresponding to the plurality of output pins, and a GOA circuit including a plurality of signal input terminals respectively corresponding to the plurality of output pins, wherein each of the plurality of output pins is electrically connected to the corresponding signal input terminal through the corresponding filter unit, and each of the plurality of filter units is configured to filter an electrostatic voltage transmitted from the corresponding signal input terminal to the corresponding output pin, therefore solving a problem that the power chip cannot work normally due to a release of static electricity from the GOA circuit to the power chip during an ESD test.

DESCRIPTION OF FIGURES

To further understand the features and technical contents of the present disclosure, please refer to the following detailed description and the accompanying figures. However, the figures are only for reference and explanation, and are not intended to limit the present disclosure.

In the figures.

DETAILED DESCRIPTION OF PREFERRED EMBODIMENTS

In order to further clarify the technical means and effects of the present disclosure, the following detailed description will be made in conjunction with the preferred embodiments of the present disclosure and the accompanying figures.

Figure 1:
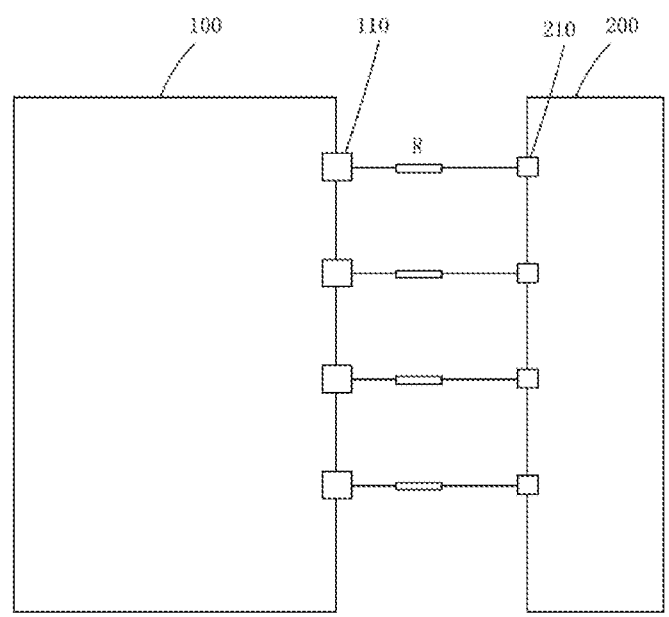
FIG. 1 shows a circuit diagram of a conventional gate driver on array (GOA) circuit driving system.
Figure 2:
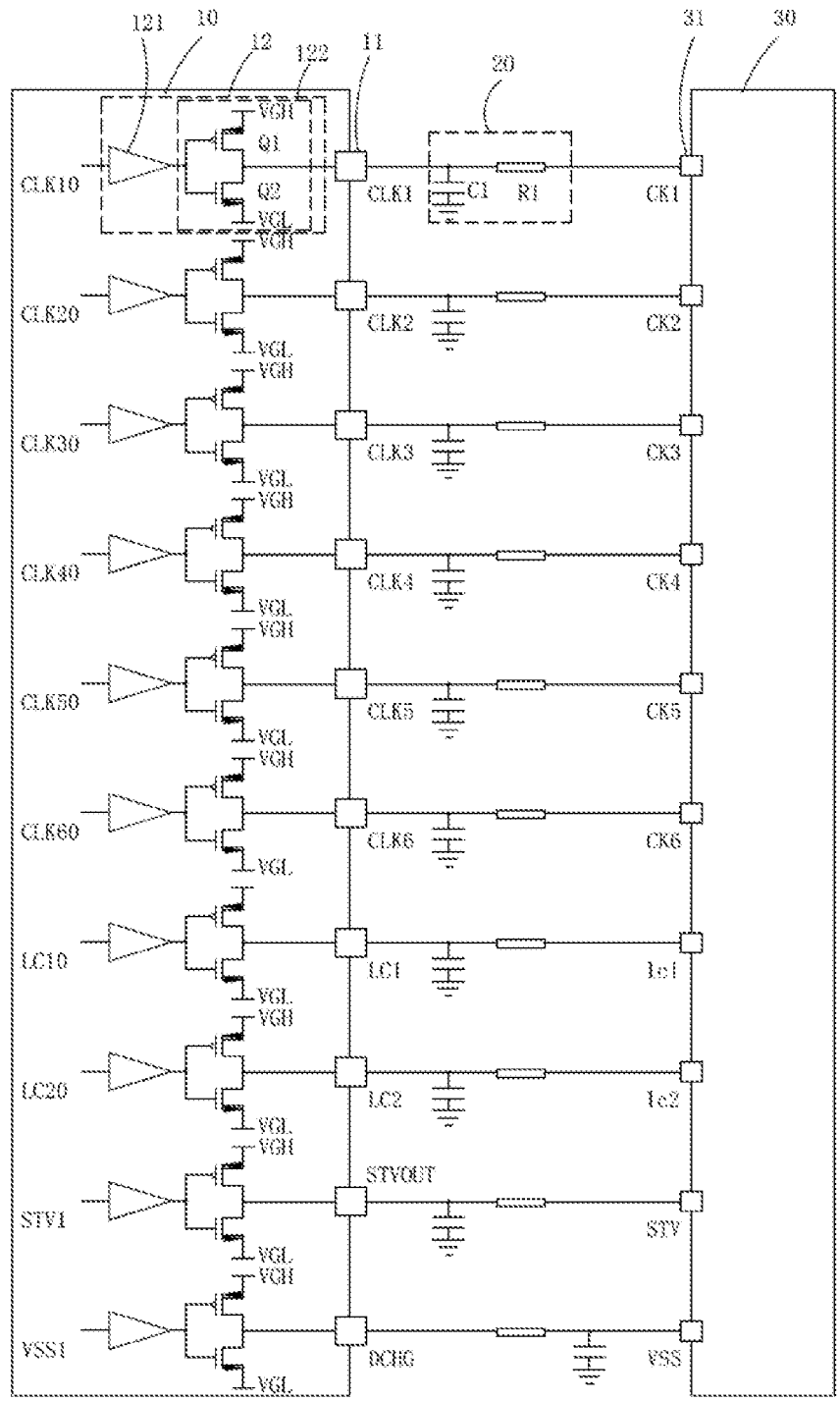
FIG. 2 shows a circuit diagram of GOA circuit driving system of the present disclosure.

Referring to FIG. 2, the present disclosure provides a gate driver on array (GOA) circuit driving system, which includes a power chip 10 including a plurality of output pins 11. A GOA circuit 30 includes a plurality of signal input terminals 31 respectively corresponding to the plurality of output pins 11. A plurality of filter units 20 respectively correspond to the plurality of output pins 11; wherein each of the plurality of output pins 11 is electrically connected to the corresponding signal input terminal 31 through the corresponding filter unit 20. Each of the plurality of filter units 20 is configured to filter an electrostatic voltage transmitted from the corresponding signal input terminal 31 to the corresponding output pin 11.

Specifically, referring to FIG. 2, each of the plurality of filter units 20 includes a filter capacitor C1, and each of the plurality of output pins 11 and the corresponding signal input terminal 31 are electrically connected to a first terminal of the filter capacitor C1 of the corresponding filter unit 20. A second terminal of each of the plurality of filter capacitors C1 is grounded.

Preferably, the filter capacitor C1 is provided with a withstand voltage of 45 to 55 volts, preferably 50 volts.

Specifically, referring to FIG. 2, the plurality of output pins 11 include a plurality of clock signal output pins, a plurality of low-frequency control signal output pins, a start signal output pin STVOUT, and a low electric potential output pin DCHG; wherein the plurality of signal input terminals 31 include a plurality of clock signal input terminals respectively corresponding to the plurality of clock signal output pins, a plurality of low-frequency control signal input terminals respectively corresponding to the plurality of low-frequency control signal output pins, a start signal input terminal STV corresponding to the start signal output pin STVOUT, and a constant voltage low voltage potential input terminal VSS corresponding to the low electric potential output pin DCHG.

Further, referring to FIG. 2, the plurality of clock signal output pins include a first clock signal output pin CLK1, a second clock signal output pin CLK2, a third clock signal output pin CLK3, a fourth clock signal output pin CLK4, a fifth clock signal output pin CLK5, and a sixth clock signal output pin CLK6. The plurality of clock signal input terminals include a first clock signal input terminal CK1, a second clock signal input terminal CK2, a third clock signal input terminal CK3, a fourth clock signal input terminal CK4, a fifth clock signal input terminal CK5, and a sixth clock signal input terminal CK6, respectively corresponding to the first clock signal output pin CLK1, the second clock signal output pin CLK2, the third clock signal output pin CLK3, the fourth clock signal output pin CLK4, the fifth clock signal output pin CLK5, and the sixth clock signal output pin CLK6. The plurality of low-frequency control signal output pins 31 include a first low-frequency control signal output pin LC1 and a second low-frequency control signal output pin LC2. The plurality of low-frequency control signal input terminals include a first low-frequency control signal input terminal Ic1 and a second low-frequency control signal input terminal Ic2 respectively corresponding to the first low-frequency control signal output pin LC1 and the second low-frequency control signal output pin LC2.

Further, a capacitance of the filter capacitor C1 of the filter unit 20 corresponding to the plurality of clock signal output pins, the plurality of low-frequency control signal output pins, and the start signal output pin is 90 to 110 pF, preferably 100 pF. A capacitance of the filter capacitor C1 of the filter unit 20 corresponding to the low voltage potential output pin DCHG is 0.9 to 1.1 µF, preferably 1 µF.

Specifically, referring to FIG. 2, each filter unit 20 further includes a resistor R1, a terminal of the resistor R1 of the filter unit 20 corresponding to the plurality of clock signal output pins, the plurality of low-frequency control signal output pins, and the start signal output pin STVOUT is electrically connected to a first terminal of the filter capacitor C1, and another terminal of the resistor R1 is electrically connected to the corresponding signal input terminal 31, thereby electrically connecting the corresponding signal input terminal 31 and the first terminal of the filter capacitor C1. A terminal of the resistor R1 of the filter unit 20 corresponding to the low voltage potential output pin DCHG is electrically connected to a first terminal of the filter capacitor C1, and another terminal of the resistor R1 of the filter unit 20 corresponding to the low voltage potential output pin DCHG is electrically connected to the low voltage potential output pin DCHG, thereby electrically connecting the first terminal of the filter capacitor C1 and the low voltage potential output pin DCHG.

Further, a resistance of the resistor R1 of the filter unit 20 corresponding to the plurality of clock signal output pins is 50 to 60Ω, preferably 56Ω; a resistance of the resistor R1 of the filter unit 20 corresponding to the plurality of low-frequency control signal output pins is 810 to 830Ω, preferably 820Ω; a resistance of the resistor R1 of the filter unit 20 corresponding to, the start signal output pin STVOUT is 140 to 160Ω, preferably 150Ω; and a resistance of the resistor R1 of the filter unit 20 corresponding to the low voltage potential output pin DCHG is 9 to 11Ω, preferably 10Ω.

Specifically, referring to FIG. 2, the power chip 10 further includes a plurality of driving signal generating units 12 respectively corresponding to the plurality of output pins 11. Each input terminal of the plurality of driving signal generating units 12 receives an original input signal corresponding to the corresponding output pin 11, each output terminal of the plurality of driving signal generating unit 12 is electrically connected to the corresponding output pin 11, and the driving signal generating units 12 are configured to convert the original input signal to generate the driving signal, and output the driving signal by the output terminal of the driving signal generating unit 12 to the corresponding output pin 11.

Further, referring to FIG. 2, each of the plurality of driving signal generating units 12 includes an electric potential converting unit 121 and an inverter 122. An input terminal of the electric potential converting unit 121 receives the corresponding original input signal, an output terminal of the electric potential converting unit 122 is electrically connected to an input terminal of the inverter 122. An output terminal of the inverter 122 is electrically connected to the corresponding output pin 11. The electric potential converting unit 121 is configured to perform electric potential conversion on the original input signal to generate a converted input signal, and output the converted input signal from the output terminal of the electric potential converting unit 121 to the inverter 122. The inverter 122 is configured to perform an inverting process on the converted input signal to generate the corresponding driving signal and output the driving signal to the corresponding output pin 11 by the output terminal of the inverter 122.

Further, please refer to FIG. 2, the first clock signal output pin CLK1, the second clock signal output pin CLK2, the third clock signal output pin CLK3, the fourth clock signal output pin CLK4, the fifth clock signal output pin CLK5, the sixth clock signal output pin CLK6, the first low-frequency control signal output pin LC1, the second low-frequency control signal output pin LC2, the start signal output pin STVOUT, and the low potential output pin DCHG correspond to a first input signal CLK10, a second input signal CLK20, a third input signal CLK30, a fourth input signal CLK40, a fifth input signal CLK50, a sixth input signal CLK60, a seventh input signal LC10, an eighth input signal LC20, a ninth input signal STV1, and a tenth input signal VSS1 of the original input signals, respectively. The plurality of driving signal generating units 12 respectively convert the first input signal CLK10, the second input signal CLK20, the third input signal CLK30, the fourth input signal CLK40, the fifth input signal CLK50, the sixth input signal CLK60, the seventh input signal LC10, the eighth input signal LC20, the ninth input signal STV1, and the tenth input signal VSS1 to generate a first clock signal, a second clock signal, a third clock signal, a fourth clock signal, a fifth clock signal, a sixth clock, a first low-frequency control signal, a second low-frequency control signal, a start signal, and a constant voltage low electric potential signal, respectively, and output to the first clock signal output pin CLK1, the second clock signal output pin CLK2, the third clock signal output pin CLK3, the fourth clock signal output pin CLK4, the fifth clock signal output pin CLK5, the sixth clock signal output pin CLK6, the first low-frequency control signal output pin LC1, the second low-frequency control signal output pin LC2, the start signal output pin STVOUT, and the low electric potential output pin DCHG, and further transmit the first clock signal, the second clock signal, the third clock signal, the fourth clock signal, the fifth clock signal, the sixth clock signal, the first low-frequency control signal, the second low-frequency control signal, the start signal, and the constant voltage low electric potential to the first clock signal input terminal CK1, the second clock signal input terminal CK2, the third clock signal input terminal CK3, the fourth clock signal input terminal CK4, the fifth clock signal input terminal CK5, the sixth clock signal input terminal CK6, the first low-frequency control signal input terminal Ic1, the second low-frequency control signal input terminal Ic2, the start signal input terminal STV, and the low potential input terminal VSS, respectively, thereby driving the GOA circuit 30 to generate the gate scan signals.

Specifically, the inverter 13 includes a P-type field effect transistor Q1 and an N-type field effect transistor Q2. A gate of the P-type field effect transistor Q1 is the input terminal of the inverter 13 and is electrically connected to the gate of the N-type field effect transistor Q2, a source of the P-type field effect transistor Q1 is connected to the constant voltage high electric potential VGH, and a drain of the P-type field effect transistor Q1 is the output terminal of the inverter 13 and is electrically connected to the drain of the N-type field effect transistor Q2. A source of the N-type field effect transistor Q2 is connected to a constant voltage negative low electric potential VGL.

It should be noted that the GOA circuit driving system of the present disclosure provides the plurality of filter units 20 corresponding to the plurality of output pins 11 respectively, and each output pin 11 is electrically connected the corresponding signal input terminal 31 through the corresponding filter unit 20, the filter unit 20 includes a capacitor C1 having less capacitance, so that when performing the EDA test, when the GOA circuit 30 discharges the electrostatic voltage through the plurality of signal input terminals 31, because of the short time of the electrostatic discharge, the plurality of capacitors C1 of the plurality of filter units 20 can filter the electrostatic voltage transmitted by the corresponding signal input terminal 31 to the corresponding output pin 11 to prevent the electrostatic voltage from being reversed into the power chip 10 via the plurality of output pins 11, solving the problem that the power supply chip 10 cannot work normally due to the release of static electricity from the GOA circuit 30 to the power chip 10 in the ESD test. At the same time, because the capacitance of the capacitor C1 in the present disclosure is less, the waveform of the signal output from the plurality of output pins 11 would not be influenced during normal driving.

Based on the same inventive concept, the present disclosure also provides a display device including the above-described GOA circuit driving system, and the structure of the GOA circuit system will not be repeatedly described herein.

It should be noted that the GOA circuit driving system of the display device of the present disclosure provides the plurality of filter units 20 corresponding to the plurality of output pins 11 respectively, and each output pin 11 is electrically connected the corresponding signal input terminal 31 through the corresponding filter unit 20, the filter unit 20 includes a capacitor C1 having less capacitance, so that when performing the EDA test, when the GOA circuit 30 discharges the electrostatic voltage through the plurality of signal input terminals 31, because of the short time of the electrostatic discharge, the plurality of capacitors C1 of the plurality of filter units 20 can filter the electrostatic voltage transmitted by the corresponding signal input terminal 31 to the corresponding output pin 11 to prevent the electrostatic voltage from being reversed into the power chip 10 via the plurality of output pins 11, solving the problem that the power supply chip 10 cannot work normally due to the release of static electricity from the GOA circuit 30 to the power chip 10 in the ESD test. At the same time, because the capacitance of the capacitor C1 in the present disclosure is less, the waveform of the signal output from the plurality of output pins 11 would not be influenced during normal driving.

In summary, the GOA circuit driving system of the present disclosure includes a power chip including a plurality of output pins, a plurality of filter units respectively corresponding to the plurality of output pins, and a GOA circuit including a plurality of signal input terminals respectively corresponding to the plurality of output pins, wherein each of the plurality of output pins is electrically connected to the corresponding signal input terminal through the corresponding filter unit, and each of the plurality of filter units is configured to filter an electrostatic voltage transmitted from the corresponding signal input terminal to the corresponding output pin, therefore solving the problem that the power chip cannot work normally due to the release of static electricity from the GOA circuit to the power chip in the ESD test.

In the above, various other changes and modifications can be made in accordance with the technical solutions and technical concept of the present disclosure, and all such changes and modifications are within the scope of the claims of the present disclosure.

What is claimed is:

1. A gate driver on array (GOA) circuit driving system, comprising:
   a power chip comprising a plurality of output pins and comprising a plurality of driving signal generating units respectively corresponding to the plurality of output pins;
   a GOA circuit comprising a plurality of signal input terminals respectively corresponding to the plurality of output pins; and
   a plurality of filter units respectively corresponding to the plurality of output pins;
   wherein each of the plurality of output pins is electrically connected to the corresponding signal input terminal through the corresponding filter unit, and each of the plurality of filter units is configured to filter an electrostatic voltage transmitted from the corresponding signal input terminal to the corresponding output pin;
   wherein each input terminal of the plurality of driving signal generating units receives an original input signal corresponding to the corresponding output pin, each output terminal of the plurality of driving signal generating units is electrically connected to the corresponding output pin, and the driving signal generating units are configured to convert the original input signal to generate the driving signal, and output the driving signal by the output terminal of the driving signal generating unit to the corresponding output pin;
   wherein each of the plurality of driving signal generating units comprises an electric potential converting unit and an inverter, an input terminal of the electric potential converting unit receives the corresponding original input signal, an output terminal of the electric potential converting unit is electrically connected to an input terminal of the inverter, and an output terminal of the inverter is electrically connected to the corresponding output pin; and
   wherein the electric potential converting unit is configured to perform electric potential conversion on the original input signal to generate a converted input signal, and outputs the converted input signal from the output terminal of the electric potential converting unit to the inverter, and wherein the inverter is configured to perform an inverting process on the converted input signal to generate the corresponding driving signal, and outputs the driving signal to the corresponding output pin by the output terminal of the inverter.

2. The GOA circuit driving system as claimed in claim 1, wherein each of the plurality of filter units comprises a filter capacitor, each of the plurality of output pins and the corresponding signal input terminal are electrically connected to a first terminal of the filter capacitor of the corresponding filter unit, and a second terminal of each of the plurality of filter capacitors is grounded.

3. The GOA circuit driving system as claimed in claim 2, wherein the filter capacitor is provided with a withstand voltage of 45 to 55 volts.

4. The GOA circuit driving system as claimed in claim 2, wherein the plurality of output pins comprise a plurality of clock signal output pins, a plurality of low-frequency control signal output pins, a start signal output pin, and a low electric potential output pin;
wherein the plurality of signal input terminals comprise:
a plurality of clock signal input terminals respectively corresponding to the plurality of clock signal output pins;
a plurality of low-frequency control signal input terminals respectively corresponding to the plurality of low-frequency control signal output pins;
a start signal input terminal corresponding to the start signal output pin; and
a constant voltage low electric potential input terminal corresponding to the low electric potential output pin.

5. The GOA circuit driving system as claimed in claim 4, wherein a capacitance of the filter capacitor of the filter unit corresponding to the plurality of clock signal output pins, the plurality of low-frequency control signal output pins, and the start signal output pin is 90 to 110 pF; and
a capacitance of the filter capacitor of the filter unit corresponding to the low electric potential output pin is 0.9 to 1.1 µF.

6. The GOA circuit driving system as claimed in claim 4, wherein each of the plurality of filter units further comprises a resistor,
a terminal of the resistor of the filter unit corresponding to the plurality of clock signal output pins, the plurality of low-frequency control signal output pins, and the start signal output pin is electrically connected to the first terminal of the filter capacitor, and another terminal of the resistor is electrically connected to the corresponding signal input terminal, thereby connecting the corresponding signal input terminal and the first terminal of the filter capacitor; and
a terminal of the resistor of the filter unit corresponding to the low electric potential output pin is electrically connected to the first terminal of the filter capacitor, and another terminal of the resistor of the filter unit corresponding to the low electric potential output pin is electrically connected to the low electric potential output pin, thereby electrically connecting the first terminal of the filter capacitor and the low electric potential output pin.

7. The GOA circuit driving system as claimed in claim 6, wherein a resistance of the resistor of the filter unit corresponding to the plurality of clock signal output pins is 50 to 60Ω;
a resistance of the resistor of the filter unit corresponding to the plurality of low-frequency control signal output pins is 810 to 830Ω;
a resistance of the resistor of the filter unit corresponding to the start signal output pin is 140 to 160Ω; and
a resistance of the resistor of the filter unit corresponding to the low electric potential output pin is 9 to 11Ω.

8. A display device comprising a GOA circuit driving system, wherein the GOA circuit driving system comprises:
a power chip comprising a plurality of output pins and comprising a plurality of driving signal generating units respectively corresponding to each of the plurality of output pins;
a GOA circuit comprising a plurality of signal input terminals respectively corresponding to the plurality of output pins; and
a plurality of filter units respectively corresponding to the plurality of output pins;
wherein each of the plurality of output pins is electrically connected to the corresponding signal input terminal through the corresponding filter unit, and each of the plurality of filter units is configured to filter an electrostatic voltage transmitted from the corresponding signal input terminal to the corresponding output pin
wherein each input terminal of the plurality of driving signal generating units receives an original input signal corresponding to the corresponding output pin, each output terminal of the plurality of driving signal generating unit is electrically connected to the corresponding output pin, and the driving signal generating units are configured to convert the original input signal to generate the driving signal, and output the driving signal by the output terminal of the driving signal generating unit to the corresponding output pin;
wherein each of the plurality of driving signal generating units comprises an electric potential converting unit and an inverter, an input terminal of the electric potential converting unit receives the corresponding original input signal, an output terminal of the electric potential converting unit is electrically connected to an input terminal of the inverter, and an output terminal of the inverter is electrically connected to the corresponding output pin; and
wherein the electric potential converting unit is configured to perform electric potential conversion on the original input signal to generate a converted input signal, and outputs the converted input signal from the output terminal of the electric potential converting unit to the inverter, and wherein the inverter is configured to perform an inverting process on the converted input signal to generate the corresponding driving signal, and outputs the driving signal to the corresponding output pin by the output terminal of the inverter.

9. The display device as claimed in claim 8, wherein each of the plurality of filter units comprises a filter capacitor, each of the plurality of output pins and the corresponding signal input terminal are electrically connected to a first terminal of the filter capacitor of the corresponding filter unit, and a second terminal of each of the plurality of filter capacitors is grounded.

10. The display device as claimed in claim 9, wherein the filter capacitor is provided with a withstand voltage of 45 to 55 volts.

11. The display device as claimed in claim 9, wherein the plurality of output pins comprise a plurality of clock signal output pins, a plurality of low-frequency control signal output pins, a start signal output pin, and a low electric potential output pin;
wherein the plurality of signal input terminals comprise:
a plurality of clock signal input terminals respectively corresponding to the plurality of clock signal output pins;
a plurality of low-frequency control signal input terminals respectively corresponding to the plurality of low-frequency control signal output pins;
a start signal input terminal corresponding to the start signal output pin; and
a constant voltage low potential input terminal corresponding to the low potential output pin.

12. The display device as claimed in claim 11, wherein a capacitance of the filter capacitor of the filter unit corresponding to the plurality of clock signal output pins, the plurality of low-frequency control signal output pins, and the start signal output pin is 90 to 110 pF; and
  a capacitance of the filter capacitor of the filter unit corresponding to the low electric potential output pin is 0.9 to 1.1 µF.

13. The display device as claimed in claim 11, wherein each of the plurality of the filter units further comprises a resistor,
  a terminal of the resistor of the filter unit corresponding to the plurality of clock signal output pins, the plurality of low-frequency control signal output pins, and the start signal output pin is electrically connected to the first terminal of the filter capacitor, and another terminal of the resistor is electrically connected to the corresponding signal input terminal, thereby electrically connecting the corresponding signal input terminal and the first terminal of the filter capacitor; and signal input terminal signal input terminal a terminal of the resistor of the filter unit corresponding to the low electric potential output pin is electrically connected to the first terminal of the filter capacitor, and another terminal of the resistor of the filter unit corresponding to the low electric potential output pin is electrically connected to the low electric potential output pin, thereby electrically connecting the first terminal of the filter capacitor and the low electric potential output pin.

14. The display device as claimed in claim 13, wherein a resistance of the resistor of the filter unit corresponding to the plurality of clock signal output pins is 50 to 60Ω;
  a resistance of the resistor of the filter unit corresponding to the plurality of low-frequency control signal output pins is 810 to 830Ω;
  a resistance of the resistor of the filter unit corresponding to the start signal output pin is 140 to 160Ω; and
  a resistance of the resistor of the filter unit corresponding to the low electric potential output pin is 9 to 11Ω.

* * * * *